(12) United States Patent
Schoenberg

(10) Patent No.: US 9,015,609 B2
(45) Date of Patent: Apr. 21, 2015

(54) PROVIDER TO-PROVIDER CONSULTATIONS

(75) Inventor: Roy Schoenberg, Boston, MA (US)

(73) Assignee: American Well Corporation, Boston, MA (US)

( * ) Notice: Subject to any disclaimer, the term of this patent is extended or adjusted under 35 U.S.C. 154(b) by 1102 days.

(21) Appl. No.: 12/614,842

(22) Filed: Nov. 9, 2009

(65) Prior Publication Data

US 2010/0293487 A1    Nov. 18, 2010

Related U.S. Application Data

(60) Provisional application No. 61/179,328, filed on May 18, 2009.

(51) Int. Cl.
*G06F 3/0481* (2013.01)
*G06Q 10/10* (2012.01)
*G06Q 30/02* (2012.01)

(52) U.S. Cl.
CPC ............ *G06Q 10/101* (2013.01); *G06Q 30/02* (2013.01); *G06Q 30/0283* (2013.01)

(58) Field of Classification Search
CPC .................................................... G06F 3/0481
USPC ........................................................ 715/764
See application file for complete search history.

(56) References Cited

U.S. PATENT DOCUMENTS

| | | | |
|---|---|---|---|
| 5,801,755 A * | 9/1998 | Echerer | 348/14.01 |
| 5,911,687 A * | 6/1999 | Sato et al. | 600/300 |
| 6,223,165 B1 * | 4/2001 | Lauffer | 705/7.13 |
| 6,519,570 B1 | 2/2003 | Faber et al. | |
| 6,523,010 B2 | 2/2003 | Lauffer | |
| 6,546,372 B2 | 4/2003 | Lauffer | |
| 6,549,889 B2 | 4/2003 | Lauffer | |
| 6,801,899 B2 | 10/2004 | Lauffer | |
| 7,249,045 B2 | 7/2007 | Lauffer | |
| 7,308,422 B1 * | 12/2007 | Faber et al. | 705/26.41 |
| 7,412,396 B1 | 8/2008 | Haq | |
| 7,590,550 B2 | 9/2009 | Schoenberg | |
| 7,729,938 B2 | 6/2010 | Lauffer | |
| 7,818,183 B2 * | 10/2010 | Schoenberg | 705/2 |
| 7,912,733 B2 * | 3/2011 | Clements et al. | 705/2 |
| 7,912,737 B2 * | 3/2011 | Schoenberg | 705/3 |
| 8,396,735 B2 | 3/2013 | Lauffer | |

(Continued)

FOREIGN PATENT DOCUMENTS

| | | |
|---|---|---|
| WO | WO 00/57326 | 9/2000 |
| WO | WO 01/22718 | 3/2001 |
| WO | WO 2008/141283 A2 | 11/2008 |

OTHER PUBLICATIONS

U.S. Appl. No. 12/140,760, filed Jun. 17, 2008, Schoenberg.

(Continued)

*Primary Examiner* — Reza Nabi
(74) *Attorney, Agent, or Firm* — Fish & Richardson P.C.

(57) ABSTRACT

Amongst other things, a computer-implemented method comprises receiving, by one or more computers, data indicating that a first service provider is authorized to engage in a consultation with a second service provider; and receiving, by one or more computers, a request from the first service provider to consult with the second service provider having a second service provider profile that satisfies at least some attributes in a set of attributes that define a suitable service provider.

27 Claims, 17 Drawing Sheets

(56) References Cited

U.S. PATENT DOCUMENTS

| | | | |
|---|---|---|---|
| 2001/0051765 A1 | 12/2001 | Walker et al. | |
| 2002/0010608 A1* | 1/2002 | Faber et al. | 705/8 |
| 2002/0165732 A1 | 11/2002 | Ezzeddine et al. | |
| 2002/0194131 A1* | 12/2002 | Dick | 705/51 |
| 2003/0023459 A1* | 1/2003 | Shipon | 705/2 |
| 2003/0023508 A1* | 1/2003 | Deep | 705/26 |
| 2003/0028399 A1* | 2/2003 | Davis et al. | 705/2 |
| 2003/0069752 A1 | 4/2003 | LeDain et al. | |
| 2003/0093294 A1* | 5/2003 | Passantino | 705/2 |
| 2003/0126205 A1* | 7/2003 | Lurie | 709/204 |
| 2003/0144580 A1 | 7/2003 | Iliff | |
| 2003/0195838 A1 | 10/2003 | Henley | |
| 2004/0019579 A1 | 1/2004 | Herz et al. | |
| 2004/0059603 A1* | 3/2004 | Brown et al. | 705/2 |
| 2004/0111297 A1 | 6/2004 | Schoenberg | |
| 2004/0111298 A1 | 6/2004 | Schoenberg | |
| 2004/0111622 A1 | 6/2004 | Schoenberg | |
| 2004/0152952 A1 | 8/2004 | Gotlib et al. | |
| 2004/0153343 A1 | 8/2004 | Gotlib et al. | |
| 2004/0181430 A1* | 9/2004 | Fotsch et al. | 705/2 |
| 2005/0065813 A1 | 3/2005 | Mishelevich et al. | |
| 2005/0108052 A1 | 5/2005 | Omaboe | |
| 2005/0125252 A1* | 6/2005 | Schoenberg | 705/2 |
| 2005/0125254 A1 | 6/2005 | Schoenberg | |
| 2005/0125435 A1 | 6/2005 | Schoenberg | |
| 2005/0125446 A1 | 6/2005 | Schoenberg | |
| 2005/0125487 A1 | 6/2005 | O'Connor et al. | |
| 2005/0182743 A1* | 8/2005 | Koenig | 707/1 |
| 2005/0234739 A1 | 10/2005 | Schoenberg | |
| 2005/0234745 A1 | 10/2005 | Schoenberg | |
| 2005/0288965 A1 | 12/2005 | Van Eaton et al. | |
| 2006/0106644 A1 | 5/2006 | Koo et al. | |
| 2006/0116900 A1 | 6/2006 | Jensen | |
| 2006/0122850 A1 | 6/2006 | Ward et al. | |
| 2006/0136264 A1 | 6/2006 | Easton et al. | |
| 2006/0161457 A1 | 7/2006 | Rapaport et al. | |
| 2006/0236247 A1* | 10/2006 | Morita et al. | 715/733 |
| 2006/0247968 A1 | 11/2006 | Kadry | |
| 2007/0088580 A1 | 4/2007 | Richards, Jr. | |
| 2007/0150372 A1 | 6/2007 | Schoenberg | |
| 2007/0299316 A1 | 12/2007 | Haslehurst et al. | |
| 2008/0065414 A1* | 3/2008 | Schoenberg | 705/2 |
| 2008/0065726 A1* | 3/2008 | Schoenberg | 709/205 |
| 2008/0133511 A1 | 6/2008 | Schoenberg | |
| 2008/0146277 A1* | 6/2008 | Anglin et al. | 455/556.1 |
| 2008/0288293 A1* | 11/2008 | Brown, Jr. | 705/3 |
| 2009/0063188 A1* | 3/2009 | Schoenberg | 705/2 |
| 2009/0089074 A1* | 4/2009 | Schoenberg | 705/1 |
| 2009/0089084 A1 | 4/2009 | Schoenberg | |
| 2009/0089085 A1 | 4/2009 | Schoenberg | |
| 2009/0089086 A1 | 4/2009 | Schoenberg | |
| 2009/0089088 A1* | 4/2009 | Schoenberg | 705/2 |
| 2009/0089090 A1* | 4/2009 | Schoenberg | 705/2 |
| 2009/0089096 A1 | 4/2009 | Schoenberg | |
| 2009/0089097 A1 | 4/2009 | Schoenberg | |
| 2009/0089098 A1 | 4/2009 | Schoenberg | |
| 2009/0089147 A1 | 4/2009 | Schoenberg | |
| 2009/0112623 A1* | 4/2009 | Schoenberg | 705/2 |
| 2009/0113312 A1* | 4/2009 | Schoenberg | 715/753 |
| 2009/0150252 A1* | 6/2009 | Schoenberg | 705/26 |
| 2009/0171695 A1* | 7/2009 | Cobbinah et al. | 705/3 |
| 2009/0254361 A1* | 10/2009 | Schoenberg | 705/2 |
| 2009/0262919 A1* | 10/2009 | Schoenberg | 379/221.02 |
| 2011/0004487 A1* | 1/2011 | Schoenberg | 705/2 |
| 2011/0010197 A1* | 1/2011 | Schoenberg | 705/3 |
| 2011/0106557 A1* | 5/2011 | Gazula | 705/3 |
| 2011/0196699 A1* | 8/2011 | Schoenberg | 705/2 |
| 2011/0288888 A1* | 11/2011 | Gazula | 705/3 |
| 2012/0179490 A1* | 7/2012 | Fuhrmann et al. | 705/3 |
| 2013/0182834 A1 | 7/2013 | Lauffer | |

OTHER PUBLICATIONS

U.S. Appl. No. 12/396,406, filed Mar. 2, 2009, Schoenberg.
U.S. Appl. No. 12/486,637, filed Jun. 17, 2009, Schoenberg.
U.S. Appl. No. 12/633,115, filed Dec. 8, 2009, Schoenberg.
U.S. Appl. No. 12/348,642, filed Jan. 5, 2009, Schoenberg.
U.S. Appl. No. 12/270,224, filed Nov. 13, 2008, Schoenberg.

* cited by examiner

Online Care

| | Otto Matic | My Current Availability: Available (Web & Phone) | My Account | Log Out |

Home | My Patients | My History | Message Center | Provider Reference | Help

My Patients

+ Add Patient

First Name: _____  Last Name: _____  Type: All Patients ▼

| Name | Age (years) | Relationship | | |
|---|---|---|---|---|
| Karen L. Worthington | 46 | ✚ Medical Home Manager | P2P Consultation — 154 | ✗ Remove |
| Jake N. Meyers | 42 | ✚ Medical Home Manager | P2P Consultation | ✗ Remove |
| Robert Y. Wilson | 50 | ✚ Medical Home Team Member | P2P Consultation | ✗ Remove |
| Karen K. White | 22 | ✚ Medical Home Team Member | P2P Consultation | ✗ Remove |
| Lisa M. Sanders | 29 | ✚ Medical Home Team Member — 156 | P2P Consultation | ✗ Remove |
| Katherine L. Smith | 46 | Treating Physician | P2P Consultation | ✗ Remove |
| Steven L. Lee | 49 | Treating Physician | P2P Consultation | ✗ Remove |
| Donna K. Adams | 35 | Treating Physician | P2P Consultation | ✗ Remove |
| Amy T. Perez | 22 | Treating Physician | P2P Consultation | ✗ Remove |
| Lee B. Rodriguez | 29 | Online Care Physician — 158 | P2P Consultation | ✗ Remove |
| John D. Carter | 45 | Online Care Physician | P2P Consultation | ✗ Remove |
| James K. Long | 49 | Online Care Physician | P2P Consultation | ✗ Remove |
| Connie R. Roberts | 35 | -- | P2P Consultation | ✗ Remove |
| Kim L. Bailey | 22 | -- | P2P Consultation | ✗ Remove |
| John R. Smith | 29 | -- | P2P Consultation | ✗ Remove |

Patients 1-15 of 45                                          PREVIOUS | NEXT

Online Care  Home  My Patients  My History  My Contact Available Accounts  My Account  Sign Out
Messaging Center  Provider Perspective  Help

Review Connection Details — 700

Conversation Details

*[illegible text]* on behalf of Katherine Smith [...]

Samantha Williams — 702
OB/GYN
[...]

Topics to Discuss (required) — 704

☑ Configurable topic 1 Lorem ipsum dolor sit amet, consectetur adipisicing elit, sed do eiusmod — 706
☐ Configurable topic 2 ut labore et dolore magna aliqua. Ut enim ad minim veniam, quis nostrud exercitation — 708
☐ Configurable topic 3 ut labore et dolore magna aliqua. Ut enim ad minim veniam, quis — 710

Release Statements — 712

*[illegible paragraph]*

☑ I certify that Katherine Smith has authorized me to act on his/her behalf for this conversation (Required) — 714
☑ I give permission for this provider to see Katherine Smith's Health Summary (Optional) — 716
☑ I certify that I have read and accept these Terms of Use (Required) — 718

OM Your initials ("OM") — 720

Payment Details (To be completed by the patient) — 740

*[illegible text]*

| | |
|---|---|
| 10 Min Conversation Fee | $70.00 | — 742
| Health Plan Contribution | - $60.00 |
| Your Cost: | $10.00 | — 744

[No Credit Card Supplied]

*[illegible text]*

[Connect]  [Cancel]

① Liability Release Statements — 930

Betty Peterson has accepted the following liability release statements. If you accept this engagement, a signed copy of each of these statements will be saved to your "Past Engagements" area along with a full record of this engagement.

Statement from CareTalks
Statement from Maria Lopez, OB/GYN
Statement from Blue Cross Blue Shield of Massachusetts Every web and phone conversation is covered by malpractice insurance. There are no limits on the number of conversations you can perform, and the policy is independent of your existing malpractice insurance.

Treatment, consultation, and recommendations made in an online setting (including electronic prescriptions) will be held to the same standards of appropriate practice as those in traditional face-to-face settings.

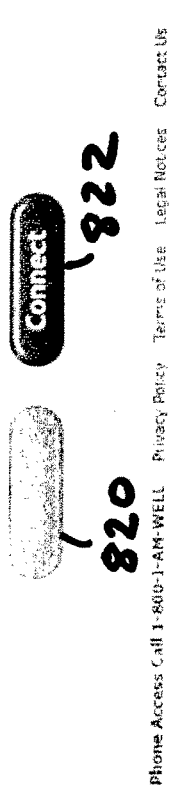

Phone Access Call 1-800-1-AM-WELL    Privacy Policy    Terms of Use    Legal Notices    Contact Us

FIG. 8B

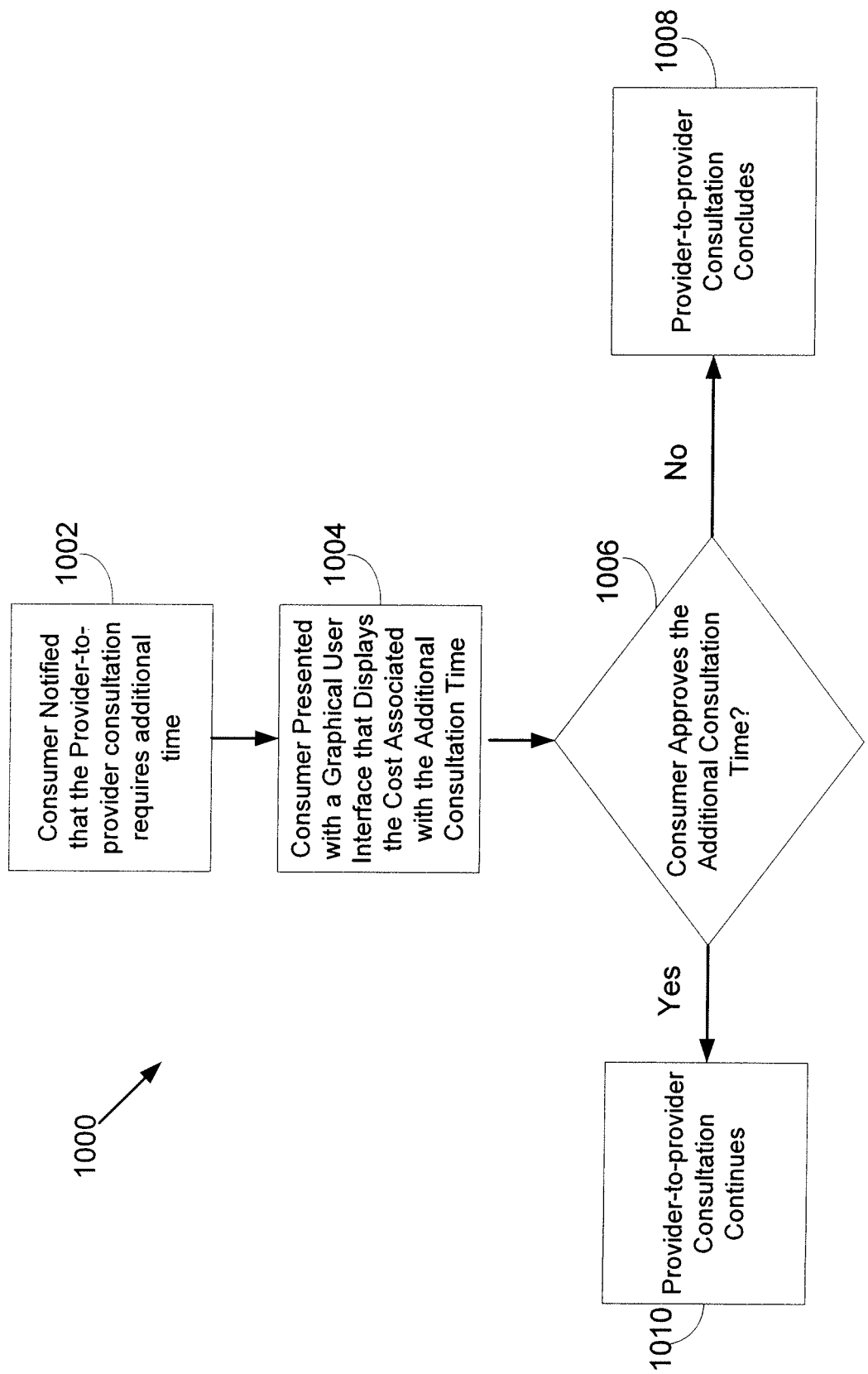

PROVIDER TO-PROVIDER CONSULTATIONS

CLAIM OF PRIORITY

This application claims priority under 35 U.S.C. §119(e) to provisional U.S. Patent Application 61/179,328, filed on May 18, 2009, the entire contents of which are hereby incorporated by reference.

BACKGROUND

The present disclosure is directed to connecting service providers with other service providers.

SUMMARY

In general, in one aspect, a computer-implemented method comprises receiving, by one or more computers, data indicating that a first service provider is authorized to engage in a consultation with a second service provider; and receiving, by one or more computers, a request from the first service provider to consult with the second service provider having a second service provider profile that satisfies at least some attributes in a set of attributes that define a suitable service provider. In one aspect, the data indicating that the first service provider is authorized to engage in the consultation with the second service provider is received from a device being operated by a consumer of services, while the first service provider is engaged with the consumer of services. In another aspect, the data indicating that the first service provider is authorized to engage in the consultation with the second service provider is received from a device operated by the first service provider.

In general, in one aspect, the method further comprises accessing a data repository that stores information pertaining to service providers, including present availability of the service providers for participating in a consultation; determining, by one or more computers, which of the service providers are presently available; identifying, by one or more computers, second service providers satisfying at least some of the attributes in the set of attributes that define suitable service providers; producing, by one or more computers, a set of presently available, second service providers that satisfy at least some of the attributes in the set of attributes; receiving a selection from the first service provider of one of the second service providers from the set of presently available, second service providers; and establishing a communication channel between the first service provider and the selected second service provider.

In yet another aspect, the method further comprises sending, to the first service provider, data indicating that the consumer of services has authorized the first service provider to consult with the second service provider. The method also comprises determining, by one or more computers, a cost associated with the first service provider consulting with the second service provider; and generating, by one or more computers, a graphical user interface that when rendered on a display, displays for a consumer of services, the cost associated with the first service provider consulting with the second service provider.

In general, in one aspect, the method further comprises generating, by one or more computers, a graphical user interface that when rendered on a display, displays for the first service provider a visual representation of the set of presently available, second service providers that satisfy at least some of the attributes in the set of attributes.

In yet another aspect, the method further comprises receiving, from the second service provider, data indicating that the second service provider is available to engage in a consultation with one or more other service providers. The method also comprises receiving, from the first service provider, at least one of first medical data and first service provider notes associated with the consultation between the first service provider and the second service provider; receiving, from the second service provider, at least one of second medical data and second service provider notes associated with the consultation between the first service provider and the second service provider; generating, by one or more computers, a consultation report from the first and second medical data and first and second service provider notes received from the first service provider and the second service provider; and sending, to a consumer of services, the consultation report.

In general, in one aspect, the method further comprises receiving a request from a consumer of services to consult with a service provider having a service provider profile that satisfies at least some attributes in a set of attributes that define a suitable service provider; accessing a data repository that stores information pertaining to service providers, including present availability of the service providers for participating in a consultation; determining, in one or more computers, which of the service providers are presently available; identifying, in one or more computers, service providers satisfying at least some of the attributes in the set of attributes that define suitable service providers; producing a set of available service providers that satisfy at least some of the attributes in the set of attributes to send to the consumer of services; receiving a selection from the consumer of one of the service providers from the set of available service providers, wherein the selected service provider is the first service provider; and establishing a realtime communication channel between the consumer of services and the first service provider.

BRIEF DESCRIPTION OF THE FIGURES

FIGS. 1B-1E, 3, 4, 6, 7A, 7B, 8A, 8B, 9A, 9B are screen images of a user interface for a provider-to-provider consultation.

FIG. 10 is a flowchart of processes used to extend the time for a provider-to-provider consultation.

DETAILED DESCRIPTION

Through a brokerage system, a consumer of services engages in a consultation with a service provider, as described in my issued Patent as published in US-2008-0065726 on Mar. 13, 2008, which is incorporated herein by reference. Additionally, through the brokerage system, a service provider (hereinafter "primary service provider") engages in a consultation (hereinafter "provider-to-provider consultation") with another service provider (hereinafter "consulting service provider"). In some examples, a primary service provider, such as a physician, engages in a consultation with a consulting service provider, such as a cardiologist, about a consumer's health, while the primary service provider is delivering care to the consumer, such as during an office visit. In other examples, the primary service provider engages in a consultation with the consulting service provider before or after the primary service provider engages in a consultation with the consumer of services. In yet another example, a service provider engages in a consultation, which is not on behalf of a consumer, with another service provider. In this example, a service provider chooses to engage in a provider-to-provider consultation for various reasons, including needing to learn more about a particular medical procedure or technique.

Figure 1A:
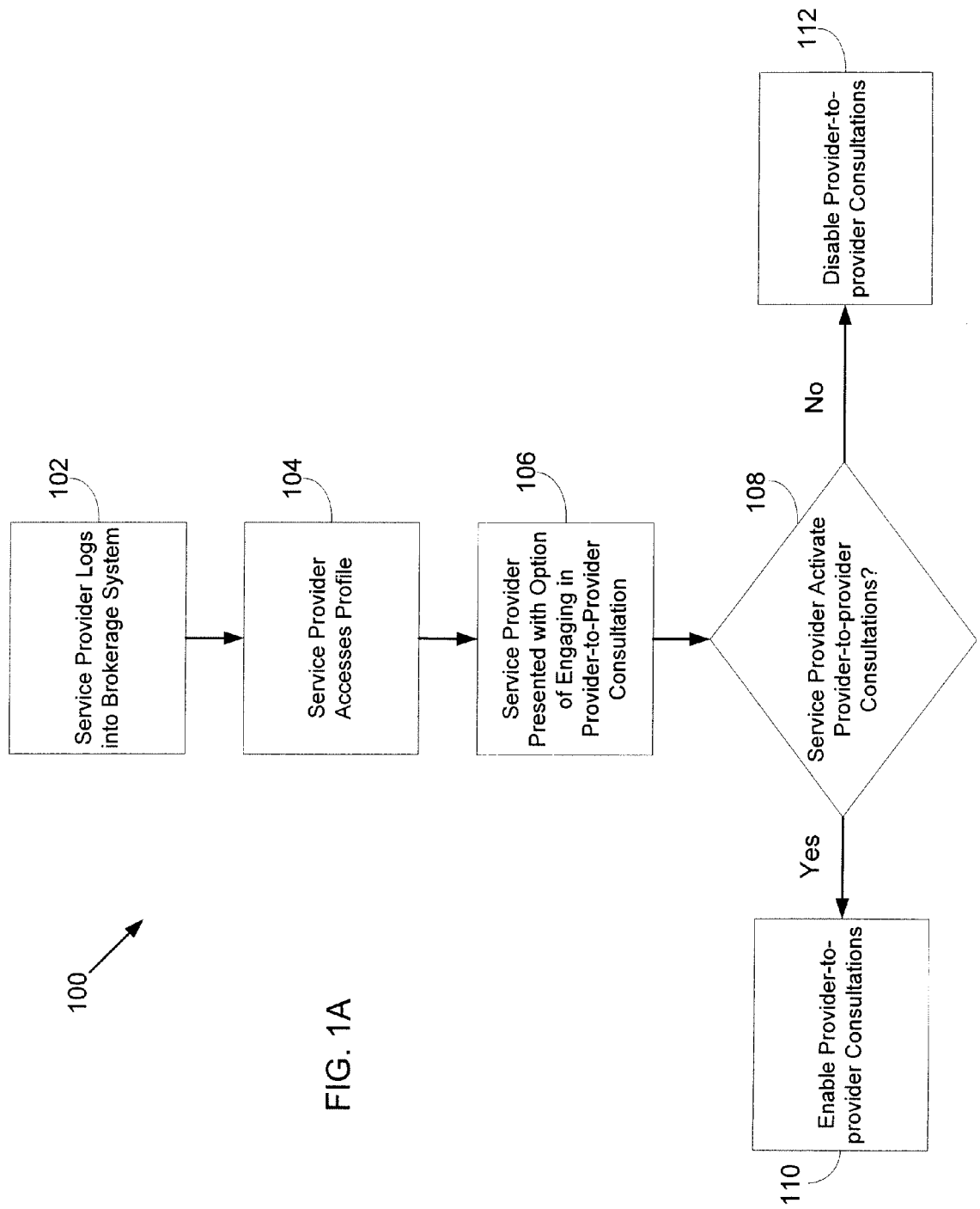
FIG. 1A is a flow chart of processes used for enabling provider-to-provider consultations.
Figure 1B:
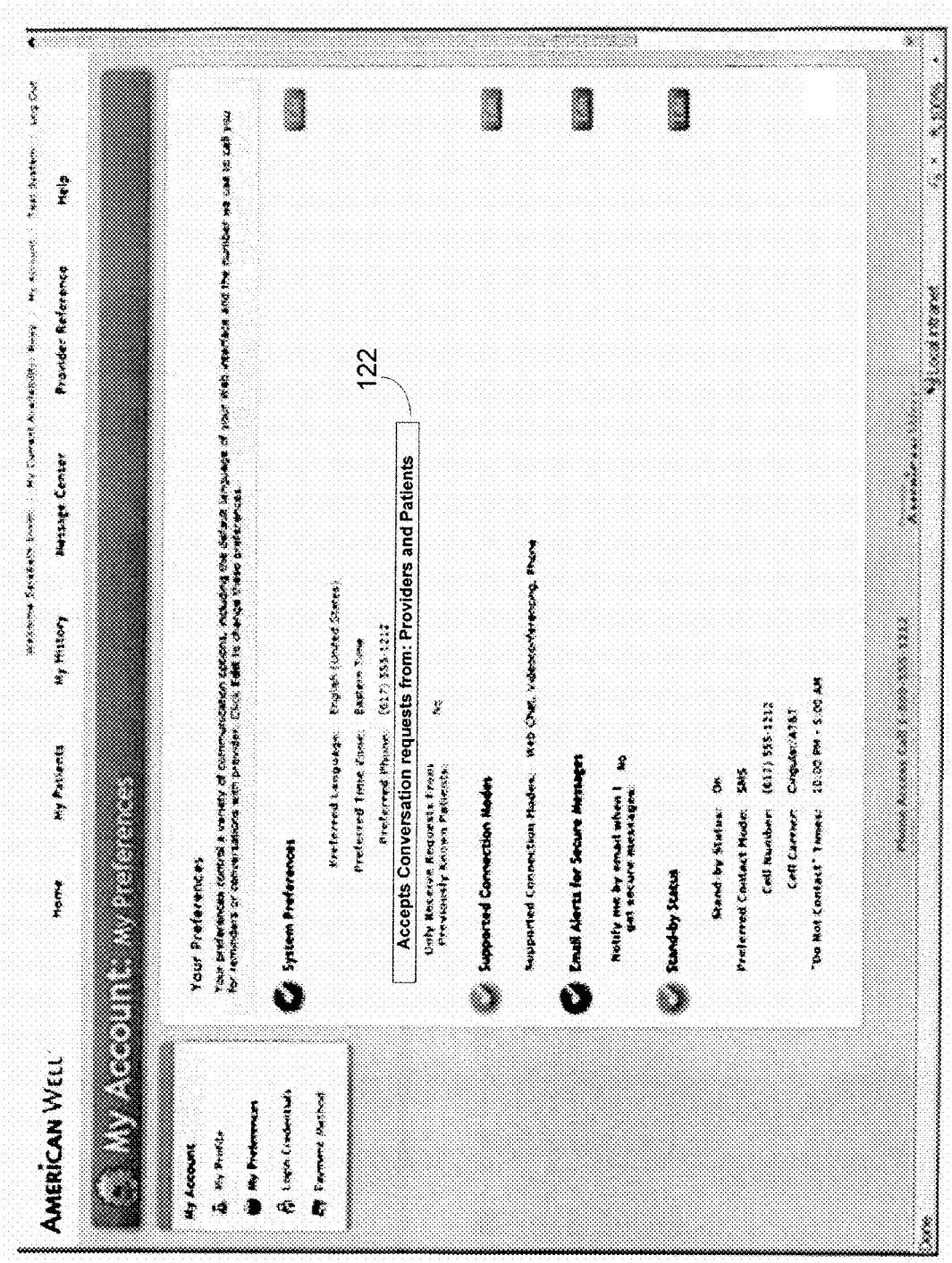
Figure 1C:
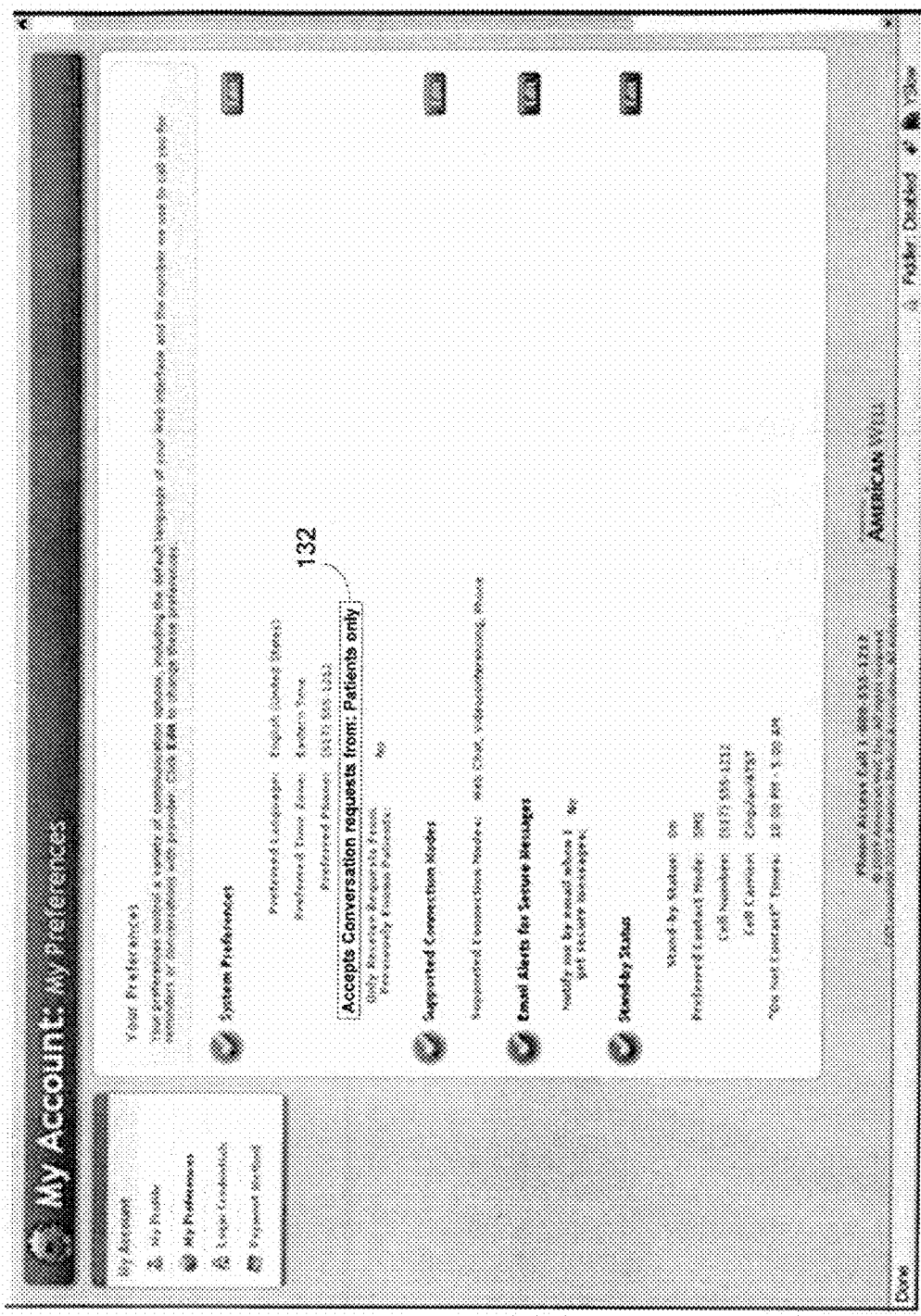

Provider-to-provider consultations allow primary service providers, such as primary care and other physicians, to obtain advice from consulting service providers, such as specialists, at the point of care, thereby increasing the value of an office visit to consumers. Since federal regulations permit provider consultations across states, provider-to-provider consultations allow primary service providers to talk to consulting service providers in any physical location across the country or the word, granting the primary service provider access to a wide network of other service providers and extending the primary service provider's base of knowledge Service providers are presented with the option of enabling and supporting provider-to-provider consultations. For example, if a service provider chooses to engage in consultations with other service providers, then when the service provider logs into the brokerage system, the brokerage system makes the service provider available for consultations with other service providers. Referring to FIG. 1A, various actions 100 are performed by a service provider in choosing whether to support provider-to-provider consultations. The service provider logs (102) into the brokerage system and accesses (104) the service provider's online profile. The brokerage system generates a graphical user interface that presents (106) the service provider with the option of engaging in provider-to-provider consultations. In some examples, a graphical user interface is displayed to the service provider that displays a link or button through which the service provider enables or disables (108) the option to engage in consultations with other service providers. By enabling this option, the service provider indicates that the service provider wants to receive requests for consultations from other service providers (i.e., primary service providers) and thereby activates provider-to-provider consultations. When the service provider activates provider-to-provider consultations, the brokerage system enables (110) provider-to-provider consultations. If the service provider does not activate provider-to-provider consultations, the brokerage system disables (112) provider-to-provider consultation for the service provider. Referring to FIG. 1B, when the service provider enables provider-to-provider consultations, a graphical user interface 120 is generated that displays text 122 indicating that provider-to-provider consultations have been enabled and that the service provider accepts conversation requests from both patients and other service providers. Referring to FIG. 1C, when the service provider disables provider-to-provider consultations, a graphical user interface 130 is generated that displays text 132 indicating that provider-to-provider consultations have been disabled and that the service provider accepts conversation requests from patients.

When a primary service provider engages in a consultation with a consulting service provider, the consumer of services authorizes the consultation. In some examples, the consumer of services selects a service provider from a list of service providers. The consumer specifies, for example through a link or button on a graphical user interface, that the selected service provider is authorized to engage in consultations with other service providers. When the selected service provider has enabled the option of engaging in consultations with other service providers, the consumer receives a message indicating that the consumer has successfully enabled provider-to-provider consultations for the selected service provider. When the selected service provider has disabled the option of engaging in consultations with other service providers, the consumer receives a message indicating that the selected service provider does not support provider-to-provider consultations. The consumer of services is also presented with the option of removing a service provider's authorization to engage in consultations with other service providers, which removes the service provider's ability to conduct provider-to-provider consultations on the consumer's behalf. In some examples, the consumer authorizes the primary service provider to engage in provider-to-provider consultations. In other examples, the consumer authorizes the consulting service provider to engage in provider-to-provider consultation. In still other examples, the consumer authorizes both the primary service provider and the consulting service provider to engage in provider-to-provider consultations.

Referring to FIG. 1D, a list 152 of consumers associated with a service provider is displayed for the service provider in a graphical user interface 150. When a consumer authorizes provider-to-provider consultations for the service provider, the graphical user interface 150 provides a visual indication 154, including a link or a button, that the service provider is authorized to engage in a consultation with another service provider. In some examples, a "P2P Consultation" link 154 is located next to the consumer's name, when the consumer authorizes the service provider to engage in consultations with other service providers. The service provider initiates a consultation with another service provider by clicking on the "P2P Consultation" link 154.

Figure 1E:
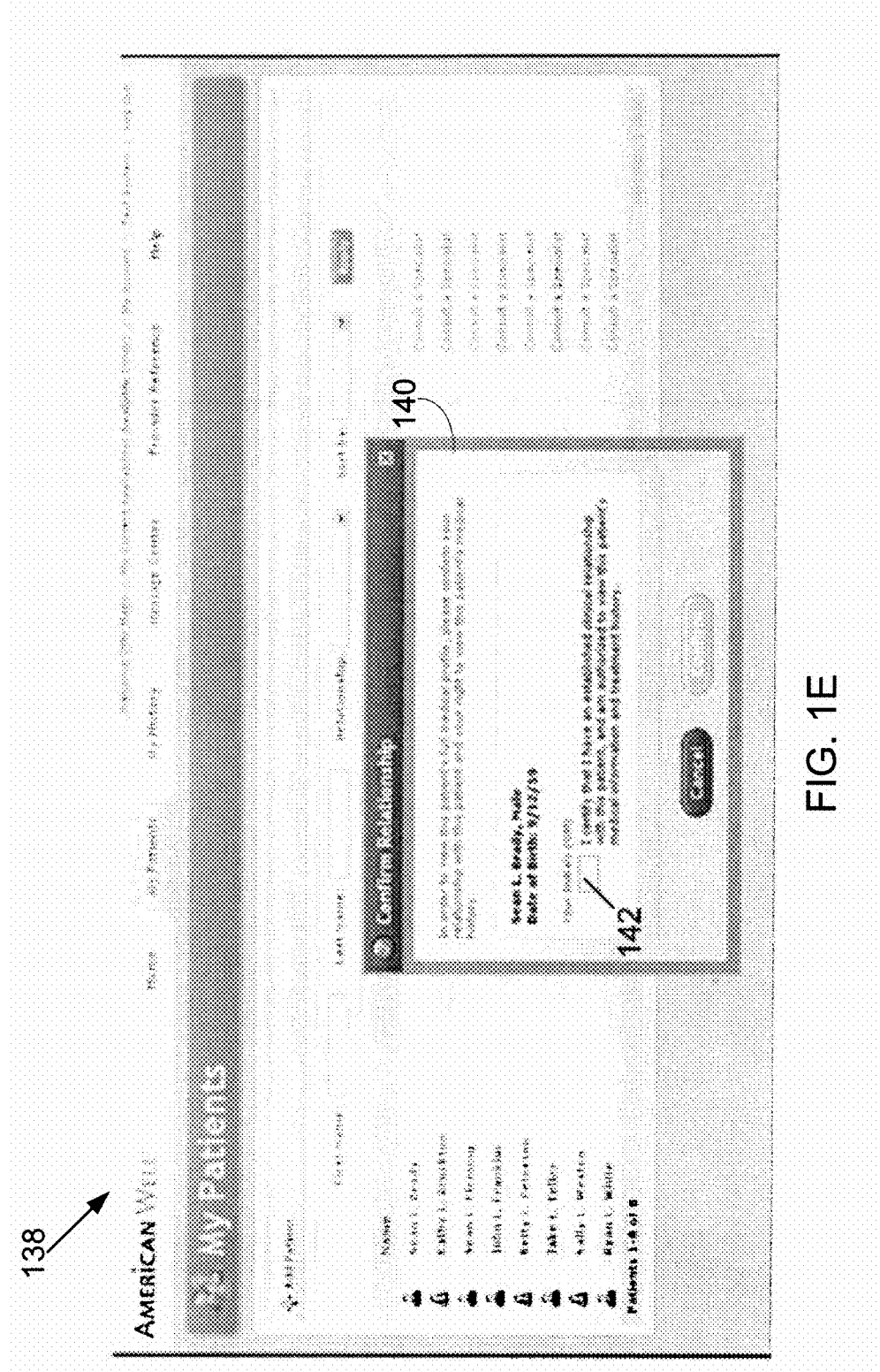

The brokerage system also enables the primary service provider to certify the primary service provider's authorization to discuss medical issues on the consumer's behalf. In some examples, the consumer is not enrolled with the brokerage system. In this example, the primary service provider certifies that the primary service provider is authorized to discuss medical issues on the consumer's behalf by electronically signing a digital statement certifying that the primary service provider has an established relationship with the consumer and is authorized by the consumer to view the consumer's medical information and conduct consultations on the consumer's behalf. Referring to FIG. 1E, a graphical user interface 138 is generated that displays a prompt box 140 with a text box 142 in which the primary service provider enters his initials and thereby certifies his authorization to view the consumer's medical information and conduct consultations on the consumer's behalf.

Figure 2:
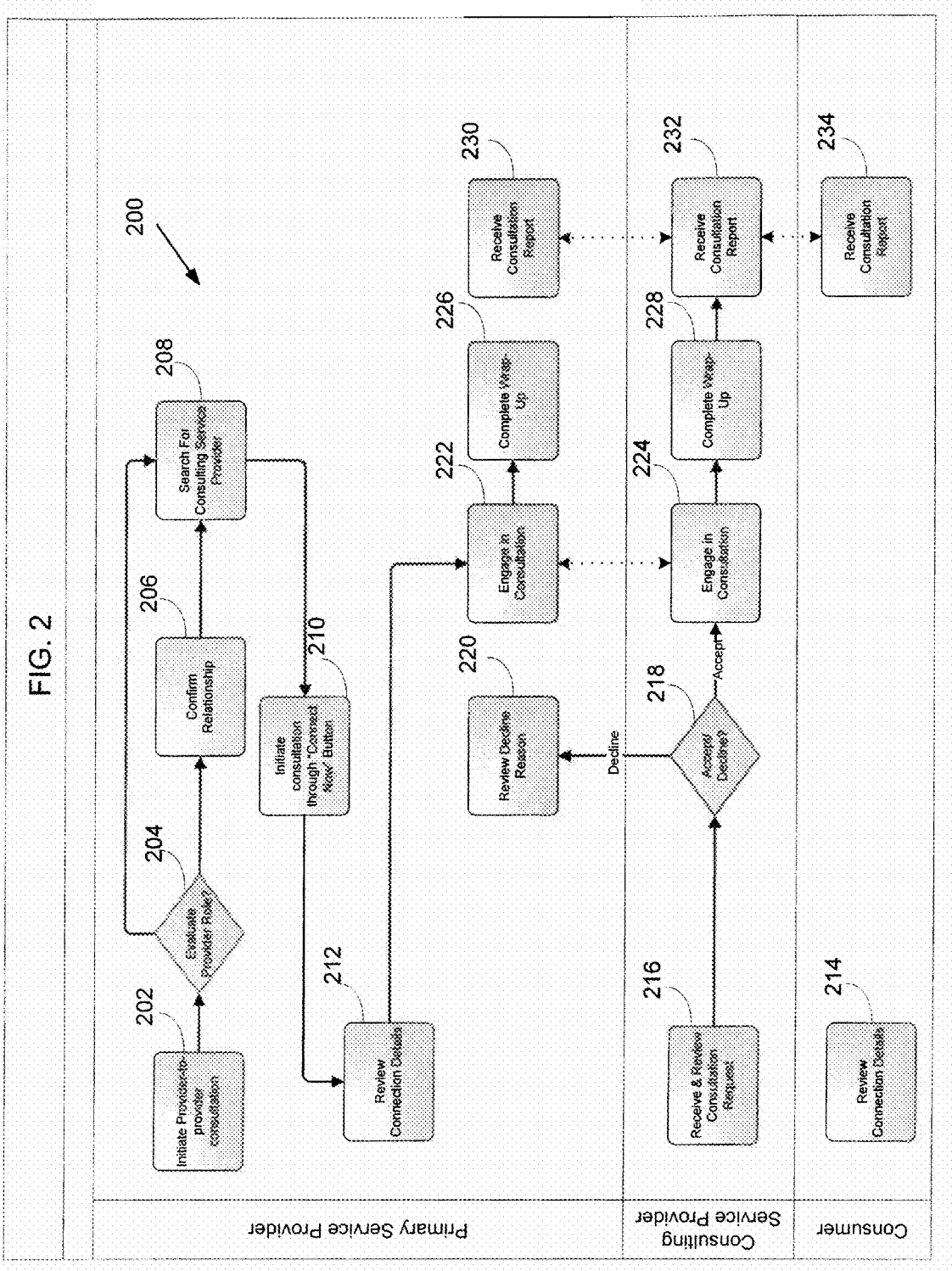
FIG. 2 is a flow chart of processes used during a provider-to-provider consultation.

Referring to FIG. 2, the primary service provider, the consulting service provider and the consumer perform various actions 200 during a provider-to-provider consultation. The primary service provider initiates (202) a provider-to-provider consultation, for example by clicking on the "P2P Consultation" link 104 (FIG. 1D). The brokerage system evaluates (204) the primary service provider's role and credentials to determine whether the brokerage system needs to confirm (206) the relationship between the primary service provider and the consumer before allowing the primary service provider to search (208) for a consulting service provider. The brokerage system confirms the primary service provider's credentials to ensure that the primary service provider is authorized to engage in a provider-to-provider consultation on behalf of the consumer.

In some examples, the brokerage system confirms (206) the relationship between the consumer and the primary service provider depending on the primary service provider's provider status, such as a treating service provider, in the brokerage system. When the primary service provider is the consumer's treating service provider, such as a primary care provider or treating physician 156 (FIG. 1D), the primary service provider's credentials are not additionally confirmed by the brokerage system prior to the primary service provider searching (208) for a consulting service provider. When the primary service provider's status is that of an online care physician 158 (FIG. 1D), the brokerage system confirms (206) the primary service provider's relationship with the consumer of services. The brokerage system confirms the relationship in various ways, including maintaining a record of the prior consultations between the online care service provider and a consumer. In another example, the primary service provider confirms the relationship with a consumer by electronically confirming his relationship with the consumer, as illustrated in FIG. 1E.

Figure 3:
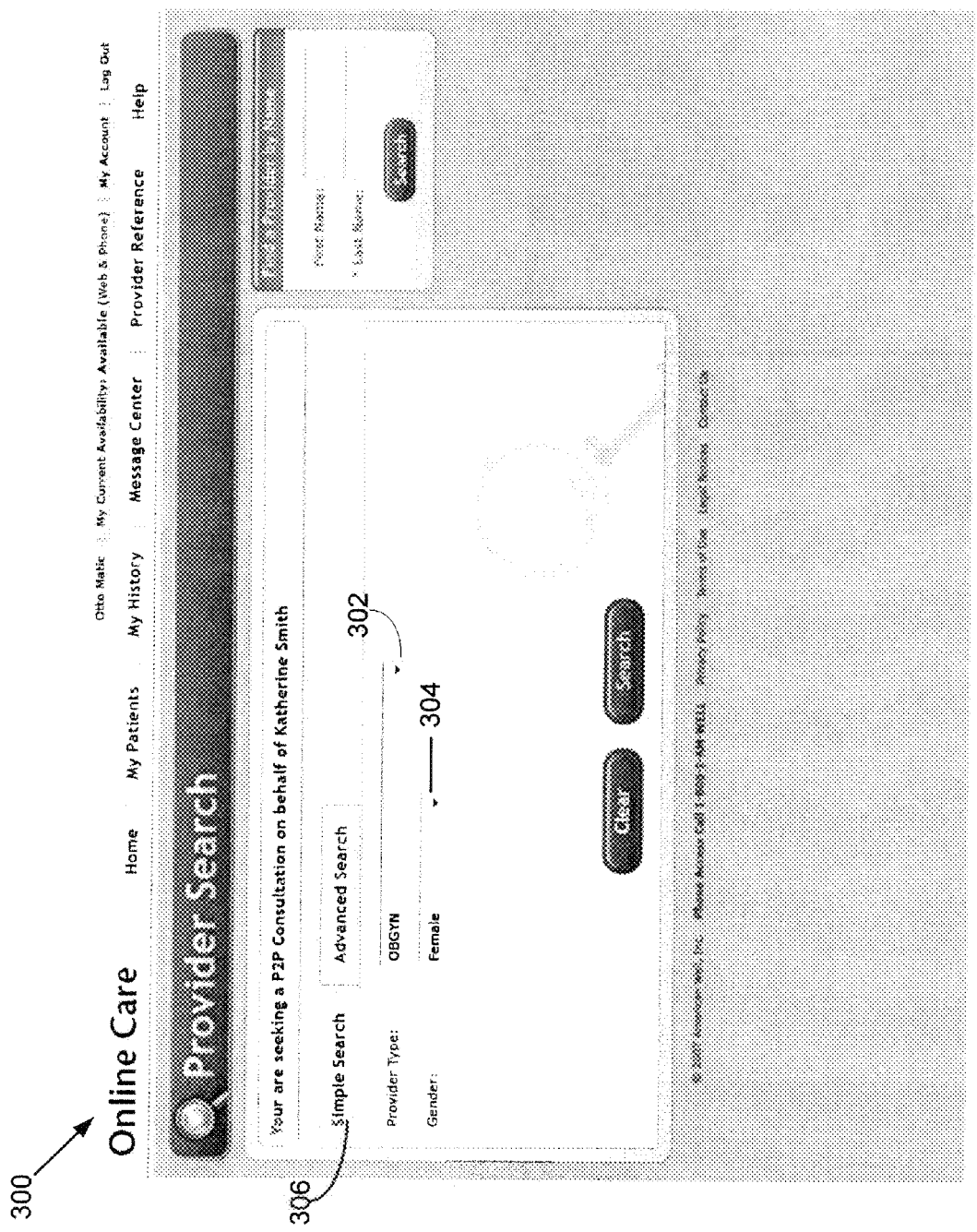
Figure 4:
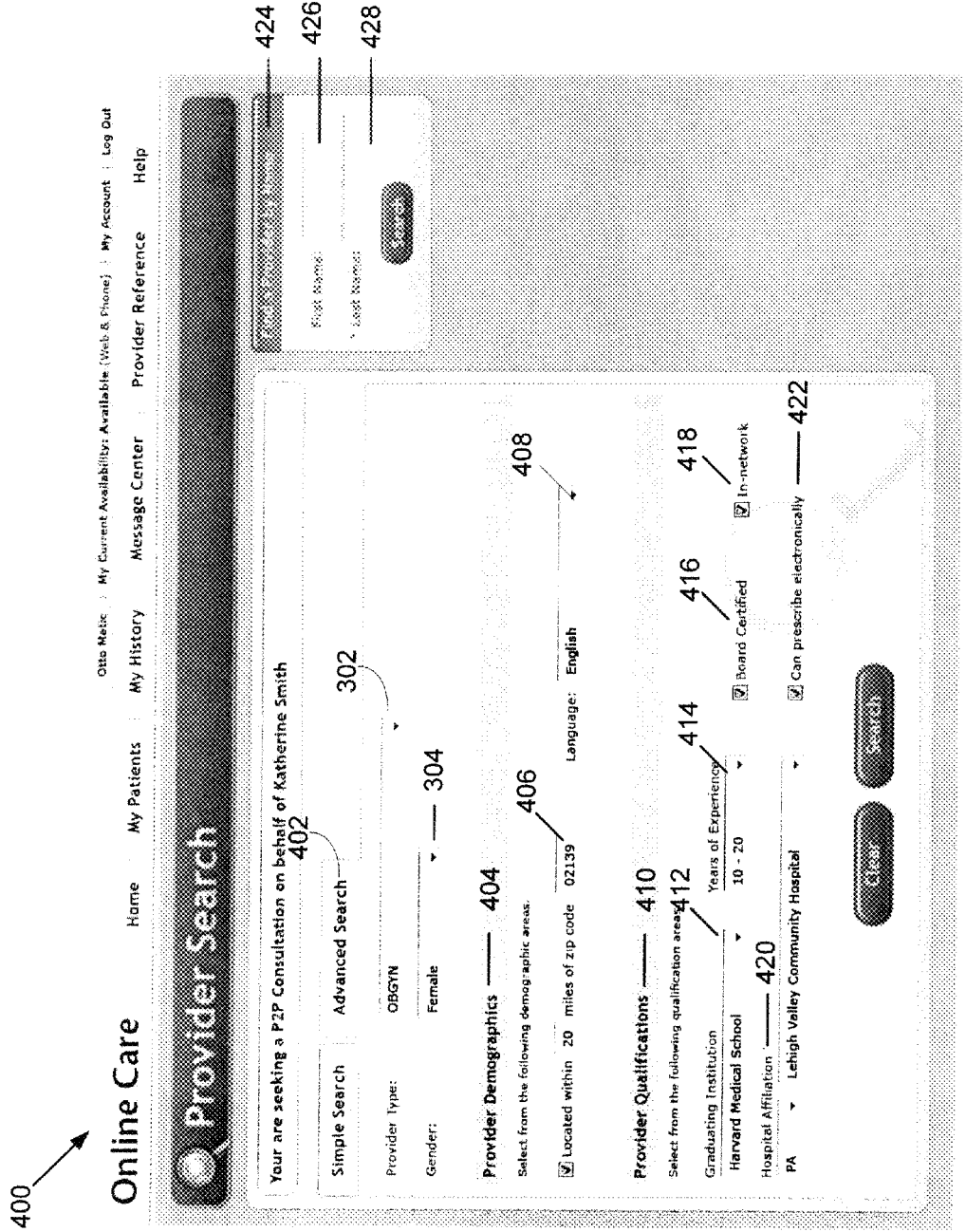

The primary service provider searches (208) for a consulting service provider by specifying various attributes of a consulting service provider. Referring to FIG. 3, a graphical user interface 300 is displayed for the primary service provider that allows the primary service provider to search for a consulting service provider based on various simple attributes 306, including provider type 302 and gender 304. Referring to FIG. 4, a graphical user interface 400 is displayed for the primary service provider that allows the primary service provider to search for a consulting service provider based on various advanced attributes 402, including provider demographics 404, such as zip code 406 and languages spoken 408, and provider qualifications 410, such as graduating institution 412, years of experience 414, board certification 416, in-network status 418, hospital affiliation 420 and a service provider's ability to make electronic prescriptions 422. The graphical user interface 400 also allows the primary service provider to search for a consulting service provider by name 424, such as the first name 426 or the last name 428 of a consulting service provider.

Figure 5:
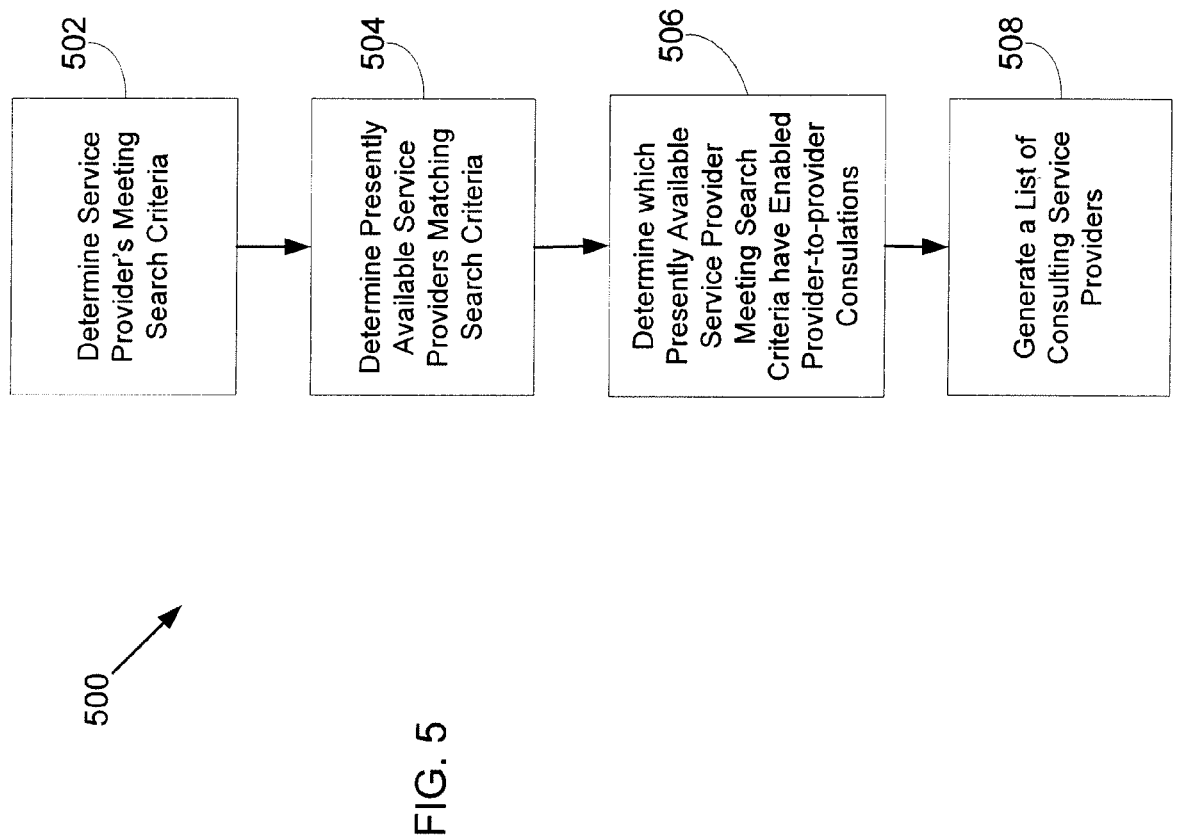
FIG. 5 is a flowchart of processes used during selecting of a service provider for a provider-to-provider consultation.

Referring to FIG. 5, the brokerage system performs various actions 500 in determining available, consulting service providers matching the search criteria ("consulting service provider attributes") entered by the primary service provider. The brokerage system determines (502) service providers with service provider attributes, such as "provider type" or "gender," matching one or more of the consulting service provider attributes entered by the primary service provider. In some examples, a list of the service providers, and their associated attributes, are stored in a database. A rules engine receives a list of the consulting service provider attributes and compares the received list of consulting service provider attributes to the attributes of the service providers included in the database. Based on the comparison, the rules engine determines (502) service providers with attributes ("matching attributes") matching one or more the consulting service provider attributes specified by the primary service provider.

From the list of service providers with matching attributes, the brokerage system determines (504) which of those service providers are presently available to engage to a consultation with the primary service provider. The brokerage system tracks the availability of service providers in real-time, for example, by monitoring whether a service provider is currently engaged in a consultation with a consumer or another service provider or by monitoring whether the service provider is logged into the brokerage system.

From the set of service providers with matching attributes and who are presently available for a consultation, the brokerage system determines (506) the service providers who have enabled provider-to-provider consultations. Based on this determination, the brokerage system generates (508) a list of consulting service providers (i.e., service providers with matching attributes, who are presently available for a consultation and who have enabled provider-to-provider consultations).

Figure 6:
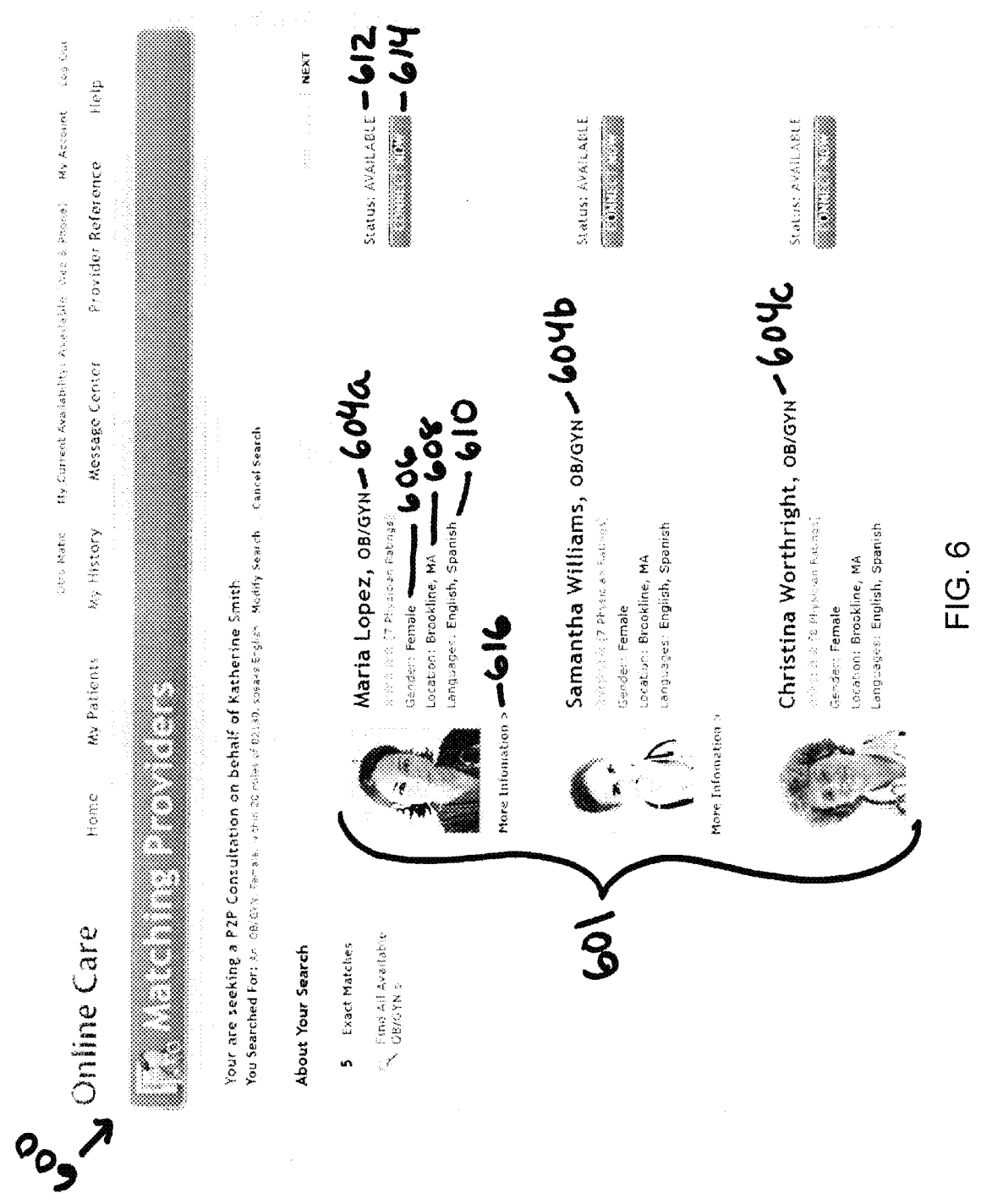

Referring to FIG. 6, a graphical user interface (600) is generated and displays a listing 601 of the consulting service providers 604a, 604b, 604c. For each of the consulting service providers, various information is displayed, such as gender 606, location 608, languages 610 and status 612. When the status 612 of a consulting service provider is available, a "Connect Now" button or link 614 is displayed. When a consulting service provider is not available for provider-to-provider consultation, the status 612 of the consulting service provider is displayed as "Not Available." By clicking on a link or button, such as the "More Information" link 616, the primary service provider views a consulting service provider's profile. In some examples, the primary service provider sends a message to a consulting service provider asking a consulting service provider a question, such as whether the consulting service provider has experience with a particular issue.

Referring to FIG. 2, by clicking on the "Connect Now" button 614, the primary service provider initiates (210) a communication with the consulting service provider and reviews (212) connection details. Referring to FIG. 7A, a graphical user interface 700, including the various connection details, is displayed for the primary service provider. The graphical user interface 700 displays a subset 702 of the consulting service provider's profile. Graphical user interface 700 displays a prompt box 704 in which the primary service provider enters additional topics to be discussed during the provider-to-provider consultation. The brokerage system also provides one or more suggested topics 706, 708, 710 for the provider-to-provider consultation. The selection of these topics 706, 708, 710 is based on various factors, including topics the primary service provider has previously used in a provider-to-provider consultation or topics that a rules engine in the brokerage system determines are relevant based on the consumer's health record. Additionally, a "Release Statements" 712 section of the graphical user interface 700 displays various release statements 714, 716, 718 and disclaimers for the primary service provider to accept. The primary service provider indicates his acceptance of the release statements 714, 716, 718 by entering his initials into an "initials" text box 720 displayed on the graphical user interface 700. In some examples, a health plan, such as Aetna or Blue Cross and Blue Shield, specifies the release statements for a primary service provider to accept prior to a provider-to-provider consultation. In other examples, the brokerage system specifies the release statements for a primary service provider to accept prior to a provider-to-provider consultation. The graphical user interface 700 also includes a payment details section 740, which includes the total cost 742 of the provider-to-provider consultation and the amount 744 a consumer's health plan is contributing to the provider-to-provider consultation.

Figure 7B:
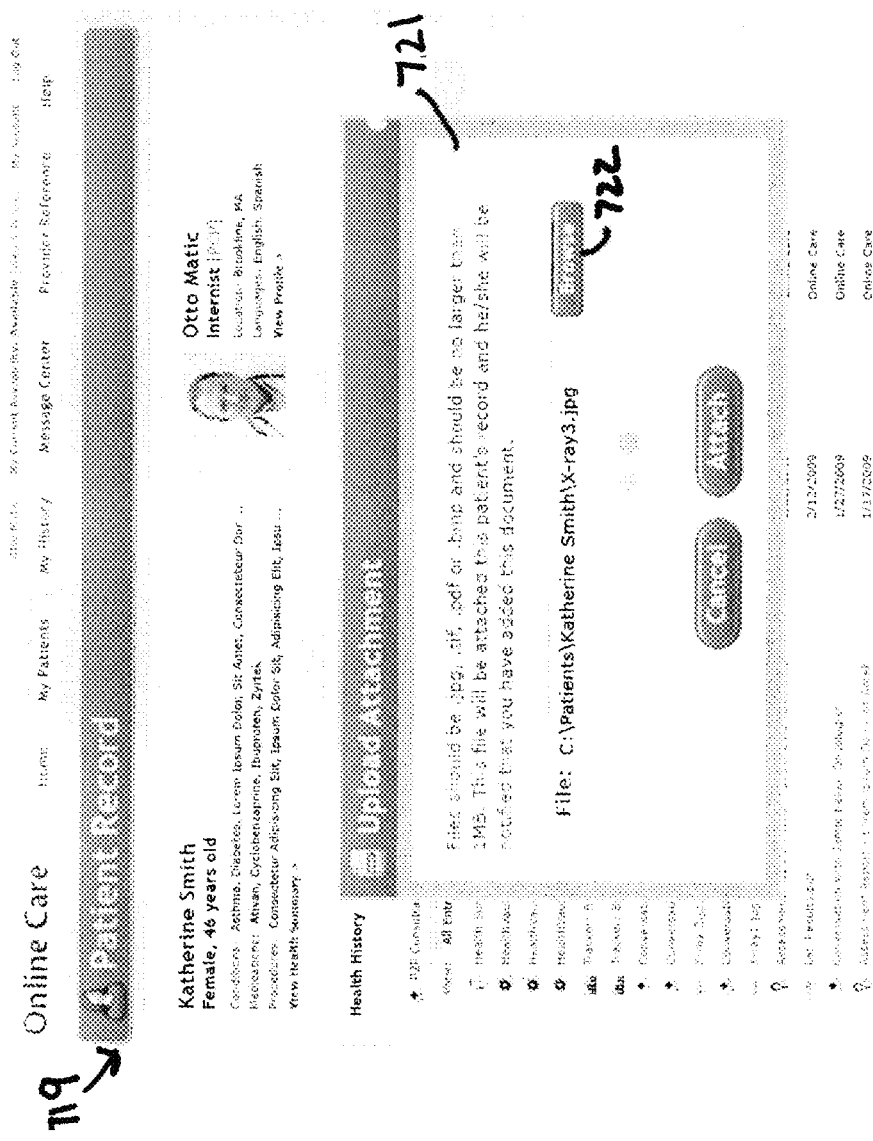

The primary service provider shares with the consulting service provider a consumer's relevant information, such as health information and other medical data, prior to the provider-to-provider consultation. The primary service provider accesses the consumer's electronic medical record ("EMR") and selects files to be shared with the consulting service provider. These files are then shared with the consulting service provider by being emailed to the consulting service provider or by the primary service provider specifying that the consulting service provider has access to view the selected files through the brokerage system. When the primary service provider wants to share a file with a consulting service provider that has not already been loaded or read into the brokerage system, the primary service provider uploads the file into the brokerage system. Referring to FIG. 7B, a dialogue box 721 is displayed in a graphical user interface 719 through which the primary service provider uploads files associated with the consumer during the connection process. Through a "browse" button 722, the primary service provider navigates to the location of the file on a personal computer or other computing device and selects the file to be uploaded.

Referring to FIG. 2, the consumer of services also reviews (214) the connection details, if the provider-to-provider consultation is being conducted on behalf of a consumer. In some examples, a graphical user interface is displayed for the consumer of services that displays the details of the provider-to-provider consultation for the consumer. This graphical user interface displays the profile of the selected, consulting service provider and the topics of conversation 706, 708, 710 selected by the primary service provider or the topics for discussion 704 entered by the primary service provider. This graphical user interface also displays a cost summary for the provider-to-provider consultation. The cost summary displays the total provider-to-provider consultation cost, the amount the consumer's health plan is contributing to the total provider-to-provider consultation cost, and the amount the consumer owes for the provider-to-provider consultation. If the consumer owes money for the provider-to-provider consultation, the consumer is prompted to enter a valid credit card number.

Additionally, during the consumer's review (214) of the connection details, the consumer reviews his health summary and health information. The consumer electronically authorizes (either through entering his initials or full name into an authorization text box) the viewing and sharing of health information with the consulting service provider or the primary service provide. When the consumer selects health information for viewing and sharing with either the primary service provider or the consulting service provider, a disclaimer is displayed for the consumer of services. The disclaimer indicates that the consumer's health information is accessible to the primary service provider and/or the consulting service provider during the provider-to-provider consultation.

In some examples, the disclaimer states that the consumer's health information and history are shareable with the consulting service provider during the provider-to-provider consultation, at the primary service provider's discretion. The consumer electronically signs (either through entering his initials or full name into an authorization text box) a disclaimer to authorize the primary service provider to act on behalf of the consumer during the provider-to-provider consultation and to authorize the primary service provider to share the consumer's health information with the consulting service provider.

Figure 8A:
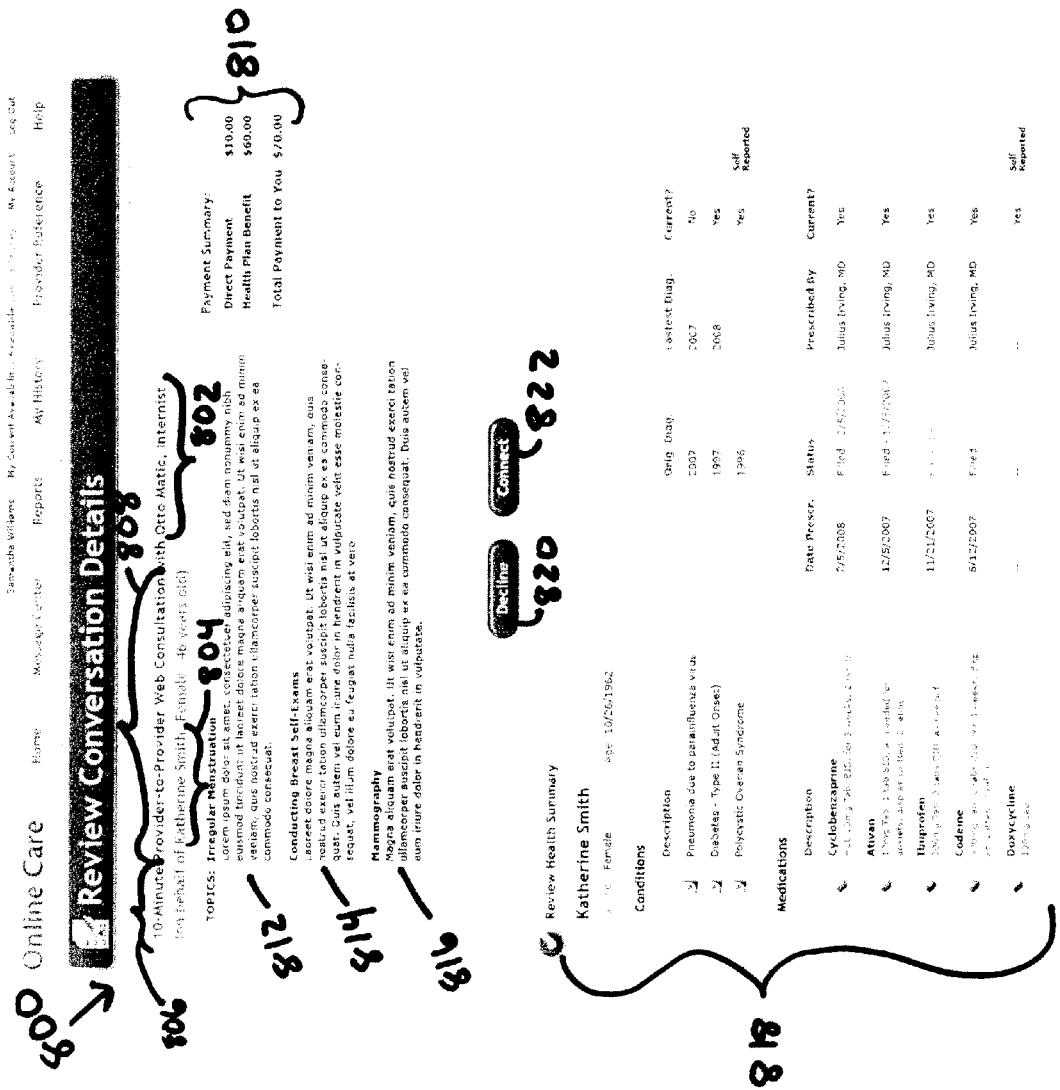

Referring to FIG. 2, the consulting service provider receives and reviews (216) the primary service provider's consultation request. Referring to FIG. 8A, a graphical user interface 800 displays, for the consulting service provider, the consultation request and other details associated with the request, including the name of the primary service provider 802, the name of the consumer 804, and the length of time 806 of the requested provider-to-provider consultation. The graphical user interface 800 also visually indicates that the requested consultation is a provider-to-provider consultation 808.

The graphical user interface 800 also displays other information associated with the provider-to-provider consultation, including a payment summary 810, profile information for the primary service provider including a photograph (not shown), provider rating information and provider location information (not shown), topics 812, 814, 816 for the provider-to-provider consultation, a history of the consulting service provider's prior interactions with the consumer of services (not shown), and a health summary 818 associated with the consumer of services. In some examples, the health summary 818 is displayed when the primary service provider has chosen to share the health summary with the consulting service provider. Referring to FIG. 8B, the graphical user interface 800 also includes a section 830 for liability release statements 832 and other disclaimers that have been accepted by the consumer of services and/or the primary service provider. When the consulting service provider accepts the request for the provider-to-provider consultation, the consulting service provider is sent a copy of each of the accepted disclaimers and release statements.

The graphical user interface 800 also displays a link or button 820 through which the consulting service provider declines the request for the provider-to-provider consultation. The graphical user interface 800 also displays a link or button 822 through which the consulting service provider accepts the request for the provider-to-provider consultation. When the consulting service provider declines a request for a provider-to-provider consultation, the consulting service provider is prompted to provide a reason for declining the request. The reason for the consulting service provider declining the provider-to-provider consultation is sent to the primary service provider, for example by email, secure message, or through a dialogue box that is displayed when rendered on a web browser of a computer. Referring to FIG. 2, if the request for the provider-to-provider consultation is declined (218), the primary service provider reviews (220) the reason that the consulting service provider declined the request.

Figure 9A:
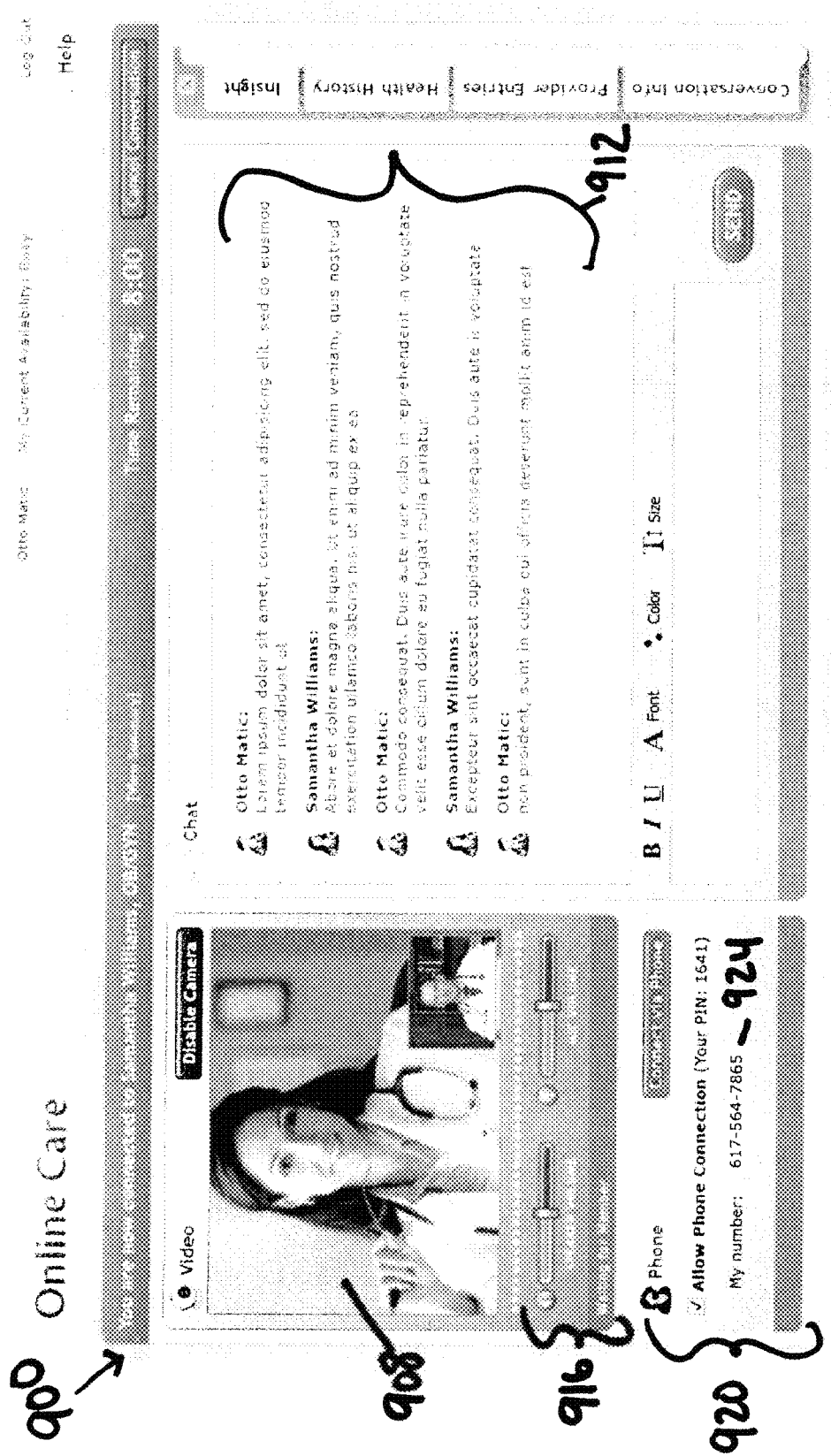
Figure 9B:
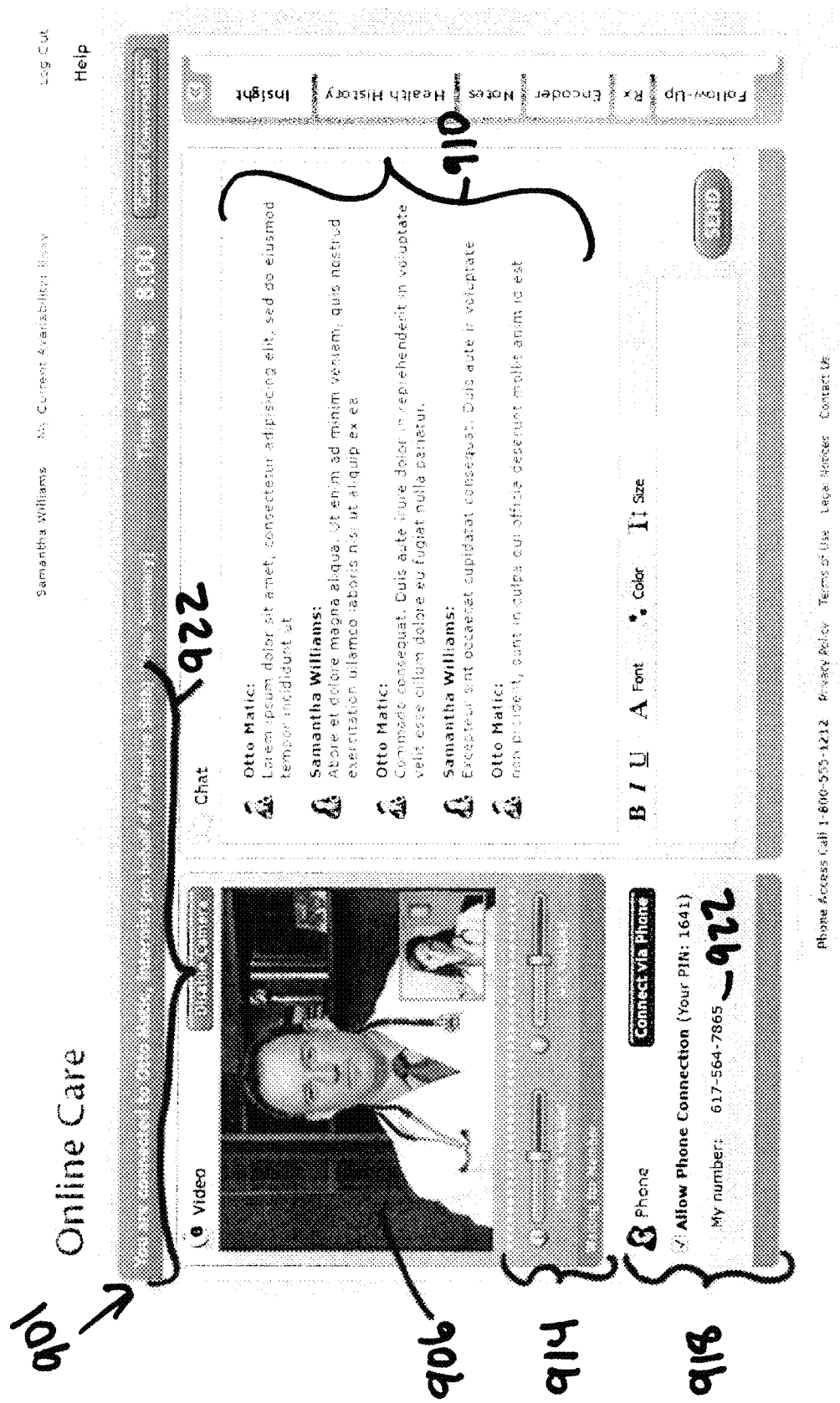

When the consulting service provider accepts the request, the primary service provider and the consulting service provider engage (222, 224) in a consultation. In some examples, the consultation is a real-time communication established over a real time communication channel, including voice, chat, text and/or video. Referring to FIGS. 9A and 9B, the primary service provider is provided with a primary service provider consultation graphical user interface 900. The consulting service provider is provided with a consulting service provider consultation graphical user interface 901. The consulting service provider consultation graphical user interface 901 displays text 922 indicating that the consultation is a provider-to-provider consultation. Through the graphical user interfaces 900, 901, the primary service provider and the consulting service provider engage in video 906, 908, voice 914, 916 and text based 910, 912 real-time communications over the Internet or any other data network.

A phone control 918, 920 allows the primary service provider or the consulting service provider to initiate a phone call with the other service provider. The telephone number of the primary service provider or the consulting service provider is displayed in a text box 922, 924.

Because the primary service provider and the consulting service provider have access to the other functionalities of the brokerage system, as described in U.S. Patent Publication No. US-2008-0065726, if the primary service provider or the consulting service provider adds notes, documents follow-up recommendations, assigns diagnoses or procedures, and/or recommends medications, this information and data are automatically stored and associated with the consumer of services in the brokerage system. Additionally, the primary service provider and/or the consulting service provider have access to online medical reference materials, which are provided through the brokerage system.

In some examples, the service providers need additional time to complete the provider-to-provider consultation. Referring to FIG. 10, various actions 1000 are performed when more time is required. The consumer is notified (1002) that the provider-to-provider consultation requires additional time. The consumer is presented (1004) with a graphical user interface that displays the cost associated with extending the time allowed for the provider-to-provider consultation. The consumer decides (1106) whether to approve the additional consultation time. If the consumer approves the additional consultation time, then the provider-to-provider consultation continues (1008). However, if the consumer does not approve the additional consultation time, then the provider-to-provider consultation concludes (1010).

Referring to FIG. 2, when the provider-to-provider consultation concludes, the primary service provider and the consulting service provider each wrap-up (226, 228) his/her portion of the provider-to-provider consultation by finalizing notes, diagnoses, recommendations and other entries. In some examples, the primary service provider is provided with a primary service provider wrap-up graphical user interface that displays conversation topics that were discussed during the provider-to-provider consultation, payment information, including the total cost of the provider-to-provider consultation, health information that was shared with the consulting service provider, a transcript of the consultation, and a copy of the profile associated with the consulting service provider. The primary service provider wrap-up graphical user interface also includes a notes field for the primary service provider to enter any additional notes for the consumer of services. Through a button or link displayed on the primary service provider wrap-up graphical user interface, the primary service provider exports health information and notes from the provider-to-provider consultation to an EMR system and also saves the health information and notes into the brokerage system.

A consulting service provider wrap-up graphical user interface is displayed for the consulting service provider. Through the consulting service provider wrap-up graphical user interface, the consulting service provider wrap-ups the consultation after the consultation has ended by performing various actions, including waiving payments associated with the consultation and entering in any additional notes from the consultation. The consulting service provider wrap-up graphical user interface also displays various information, including conversation topics discussed during the provider-to-provider consultation, payment information, health history that was shared between the consumer and/or the primary service provider, a transcript of the consultation between the primary service provider and the consulting service provider notes, diagnoses and procedures, prescriptions, and follow-up suggestions. The consulting service provider wrap-up graphical user interface also includes information about the primary service provider, including the name of the primary service provider, the rating of the primary service provider, and a picture of the primary service provider. The consulting service provider wrap-up graphical user interface also provides the consulting service provider the option to rate his overall experience with the provider-to-provider consultation.

Referring to FIG. 2, after the primary service provider and the consulting service provider have completed the wrap-up (226, 228) portion of the provider-to-provider consultation, the brokerage system generates a consultation report. The primary service provider, the consulting service provider and the consumer receive (230, 232, 234) a copy of the report. The consultation report includes a transcript of the provider-to-provider consultation and a record of the entries made by the consulting service provider and the primary service provider, including provider notes and diagnoses. In some examples, the primary service provider prints a copy of the consultation report and gives it to the consumer of services. In other examples, a graphical user interface is generated and rendered, displaying the consultation report such that the consulting service provider, the primary service provider or the consumer are able export the consultation report, by printing the consultation report or emailing it.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A computer-implemented method, the method comprising:

establishing, by one or more computers, a first real-time communication channel between a device used by first provider of services and a device used by a consumer of services;

receiving, by the one or more computers from the device used by the consumer of services and over the first real-time communication channel, data indicating that the first service provider that is engaged with the consumer over the first established real-time communication channel is authorized to engage in a consultation with a second, different service provider over a second, different real-time communication channel; and responsive to receipt of the data indicating that the first service provider that is engaged with the consumer over the first real-time communication channel is authorized to engage in a consultation with a second, different service provider, receiving, by the one or more computers from the device used by the first provider, a request to consult with the second service provider having a second service provider profile that satisfies at least some attributes in a set of attributes that the first provider specifies as defining a suitable service provider, while the first service provider is engaged with the consumer of services, wherein the method further comprising:

receiving, from the device used by the consumer of services, a request to consult with a service provider having a service provider profile that satisfies at least some attributes in a set of attributes that define a suitable service provider;

accessing a data repository that stores information pertaining to service providers, including present availability of the service providers for participating in a consultation;

determining, in the one or more computers, which of the service providers are presently available;

identifying, in the one or more computers, service providers satisfying at least some of the attributes in the set of attributes that define suitable service providers;

producing a set of available service providers that satisfy at least some of the attributes in the set of attributes to send to the consumer of services; and receiving a selection from the consumer of one of the service providers from the set of available service providers, wherein the selected service provider is the first service provider.

2. The method of claim 1, wherein the data indicating that the first service provider is authorized to engage in the consultation with the second service provider is received from the device used by the consumer of services, while the first service provider is engaged with the consumer of services.

3. The method of claim 1, wherein the data indicating that the first service provider is authorized to engage in the consultation with the second service provider is received from the device used by the first service provider.

4. The method of claim 1 further comprising:

accessing a data repository that stores information pertaining to service providers, including present availability of the service providers for participating in a consultation;

determining, by the one or more computers, which of the service providers are presently available;

identifying, by the one or more computers, second service providers satisfying at least some of the attributes in the set of attributes that define suitable service providers;

producing, by the one or more computers, a set of presently available, second service providers that satisfy at least some of the attributes in the set of attributes;

receiving a selection from the first service provider of one of the second service providers from the set of presently available, second service providers; and establishing the second, different real-time communication channel between the device used by the first service provider and a device used by the selected second service provider.

5. The method of claim 4 further comprising:

generating, by the one or more computers, data for a graphical user interface that when rendered on a display, displays for the first service provider a visual representation of the set of presently available, second service providers that satisfy at least some of the attributes in the set of attributes.

6. The method of claim 2 further comprising:

sending, to the device used by the first service provider, data indicating that the consumer of services has authorized the first service provider to consult with the second service provider.

7. The method of claim 1 further comprising:

determining, by the one or more computers, a cost associated with the first service provider consulting with the second service provider; and generating, by the one or more computers, data for a graphical user interface that when rendered on a display, displays for a consumer of services, the cost associated with the first service provider consulting with the second service provider.

8. The method of claim 1 further comprising:

receiving, from a device used by the second service provider, data indicating that the second service provider is available to engage in a consultation with one or more other service providers.

9. The method of claim 1 further comprising:

receiving, from the device used by the first service provider, at least one of first medical data and first service provider notes associated with the consultation between the first service provider and the second service provider;

receiving, from a device used by the second service provider, at least one of second medical data and second service provider notes associated with the consultation between the first service provider and the second service provider;

generating, by the one or more computers, a consultation report from the first and second medical data and first and second service provider notes received from the first service provider and the second service provider; and sending, to the device used by the consumer of services, the consultation report.

10. A computer program product residing on a non-transitory computer readable medium, the computer program product comprising instructions for causing a computer to:

establish a first real-time communication channel between a device used by first provider of services and a device used by a consumer of services;

receive, from the device used by the consumer of services and over the first real-time communication channel, data indicating that the first service provider that is engaged with the consumer over the established real-time communication channel is authorized to engage in a consultation with a second, different service provider over a second, different real-time communication channel; and responsive to receipt of the data indicating that the first service provider that is engaged with the consumer over the first real-time communication channel is authorized to engage in a consultation with a second, different service provider, receive, from the device used by the first provider, a request to consult with the second service provider having a second service provider profile that satisfies at least some attributes in a set of attributes that the first provider specifies as defining a suitable service provider, while the first service provider is engaged with the consumer of services, wherein the computer program product further comprising instructions for:

receiving, from the device used by the consumer of services, a request to consult with a service provider having a service provider profile that satisfies at least some attributes in a set of attributes that define a suitable service provider;

accessing a data repository that stores information pertaining to service providers, including present availability of the service providers for participating in a consultation;

determining, in one or more computers, which of the service providers are presently available;

identifying, in the one or more computers, service providers satisfying at least some of the attributes in the set of attributes that define suitable service providers;

producing a set of available service providers that satisfy at least some of the attributes in the set of attributes to send to the consumer of services; and receiving a selection from the consumer of one of the service providers from the set of available service providers, wherein the selected service provider is the first service provider.

11. The computer program product of claim 10, wherein the data indicating that the first service provider is authorized to engage in the consultation with the second service provider is received from the device used by the consumer of services, while the first service provider is engaged with the consumer of services.

12. The computer program product of claim 11 further comprising instructions to:
send, to the device used by the first service provider, data indicating that the consumer of services has authorized the first service provider to consult with the second service provider.

13. The computer program product of claim 10, wherein the data indicating that the first service provider is authorized to engage in the consultation with the second service provider is received from the device used by the first service provider.

14. The computer program product of claim 10 further comprising instructions to:
access a data repository that stores information pertaining to service providers, including
present availability of the service providers for participating in a consultation; determine which of the service providers are presently available;
identify second service providers satisfying at least some of the attributes in the set of attributes that define suitable service providers;
produce a set of presently available, second service providers that satisfy at least some of the attributes in the set of attributes;
receive a selection from the first service provider of one of the second service providers from the set of presently available, second service providers; and
establish the second, different real-time communication channel between the device used by the first service provider and a device used by the selected second service provider.

15. The computer program product of claim 14 further comprising instructions to:
generate data for a graphical user interface that when rendered on a display, displays for the first service provider a visual representation of the set of presently available, second service providers that satisfy at least some of the attributes in the set of attributes.

16. The computer program product of claim 10 further comprising instructions to:
determine a cost associated with the first service provider consulting with the second service provider; and generate data for a graphical user interface that when rendered on a display, displays for a consumer of services, the cost associated with the first service provider consulting with the second service provider.

17. The computer program product of claim 10 further comprising instructions to:
receive, from a device used by the second service provider, data indicating that the second service provider is available to engage in consultations with one or more other service providers.

18. The computer program product of claim 10 further comprising instructions to:
receive, from the device used by the first service provider, at least one of first medical data and first service provider notes associated with the consultation between the first service provider and the second service provider;
receive, from a device used by the second service provider, at least one of second medical data and second service provider notes associated with the consultation between the first service provider and the second service provider;
generate a consultation report from the first and second medical data and first and second service provider notes received from the first service provider and the second service provider; and
send, to the device used by the consumer of services, the consultation report.

19. An apparatus comprising: a processor; and
a computer program product residing on a non-transitory computer readable medium, the computer program product comprising instructions for causing the processor to:
establish a first real-time communication channel between a device used by first provider of services and a device used by a consumer of services;
receive, from the device used by the consumer of services and over the first real-time communication channel, data indicating that the first service provider that is engaged with the consumer over the established real-time communication channel is authorized to engage in a consultation with a second, different service provider over a second, different real-time communication channel; and
responsive to receipt of the data indicating that the first service provider that is engaged with the consumer over the first real-time communication channel is authorized to engage in a consultation with a second, different service provider,
receive, from the device used by the first provider, a request from to consult with the second service provider having a second service provider profile that satisfies at least some attributes in a set of attributes that the first provider specifies as defining a suitable service provider, while the first service provider is engaged with the consumer of services,
wherein the computer program product further comprising instructions for:
receiving, from the device used by the consumer of services, a request to consult with a service provider having a service provider profile that satisfies at least some attributes in a set of attributes that define a suitable service provider;
accessing a data repository that stores information pertaining to service providers, including present availability of the service providers for participating in a consultation;
determining, in one or more computers, which of the service providers are presently available;

identifying, in the one or more computers, service providers satisfying at least some of the attributes in the set of attributes that define suitable service providers;

producing a set of available service providers that satisfy at least some of the attributes in the set of attributes to send to the consumer of services; and receiving a selection from the consumer of one of the service providers from the set of available service providers, wherein the selected service provider is the first service provider.

20. The apparatus of claim 19, wherein the data indicating that the first service provider is authorized to engage in the consultation with the second service provider is received from the device used by the consumer of services, while the first service provider is engaged with the consumer of services.

21. The apparatus of claim 20, the computer program product further comprising instructions to:

send, to the device used by the first service provider, data indicating that the consumer of services has authorized the first service provider to consult with the second service provider.

22. The apparatus of claim 19, wherein the data indicating that the first service provider is authorized to engage in the consultation with the second service provider is received from the device used by the first service provider.

23. The apparatus of claim 19, the computer program product further comprising instructions to:

access a data repository that stores information pertaining to service providers, including present availability of the service providers for participating in a consultation;

determine which of the service providers are presently available;

identify second service providers satisfying at least some of the attributes in the set of attributes that define suitable service providers;

produce a set of presently available, second service providers that satisfy at least some of the attributes in the set of attributes;

receive a selection from the first service provider of one of the second service providers from the set of presently available, second service providers; and establish the second, different real-time communication channel between the device used by the first service provider and a device used by the selected second service provider.

24. The apparatus of claim 23, the computer program product further comprising instructions to:

generate data for a graphical user interface that when rendered on a display, displays for the first service provider a visual representation of the set of presently available, second service providers that satisfy at least some of the attributes in the set of attributes.

25. The apparatus of claim 19, the computer program product further comprising instructions to:

determine a cost associated with the first service provider consulting with the second service provider; and generate data for a graphical user interface that when rendered on a display, displays for a consumer of services, the cost associated with the first service provider consulting with the second service provider.

26. The apparatus of claim 19, the computer program product further comprising instructions to:

receive, from a device used by the second service provider, data indicating that the second service provider is available to engage in consultations with one or more other service providers.

27. The apparatus of claim 19, the computer program product further comprising instructions to:

receive, from the device used by the first service provider, at least one of first medical data and first service provider notes associated with the consultation between the first service provider and the second service provider;

receive, from a device used by the second service provider, at least one of second medical data and second service provider notes associated with the consultation between the first service provider and the second service provider;

generate a consultation report from the first and second medical data and first and second service provider notes received from the first service provider and the second service provider; and send, to the device used by the consumer of services, the consultation report.

* * * * *

UNITED STATES PATENT AND TRADEMARK OFFICE
CERTIFICATE OF CORRECTION

PATENT NO. : 9,015,609 B2  
APPLICATION NO. : 12/614842  
DATED : April 21, 2015  
INVENTOR(S) : Roy Schoenberg It is certified that error appears in the above-identified patent and that said Letters Patent is hereby corrected as shown below:

On the Title page, item (54), and in the Specification, Col. 1, line 1, delete "PROVIDER TO-PROVIDER" and insert -- PROVIDER-TO-PROVIDER --

In the Claims,

Col. 10, line 67, claim 1, delete "first established" and insert -- first --

Col. 14, line 50, claim 19, delete "from to" and insert -- to --

Signed and Sealed this  
Twenty-second Day of September, 2015

Michelle K. Lee  
*Director of the United States Patent and Trademark Office*